US012776006B2

(12) United States Patent
Fan et al.

(10) Patent No.: US 12,776,006 B2
(45) Date of Patent: Oct. 27, 2026

(54) DEVICE AND METHOD FOR DATA CLEANSING

(71) Applicant: Industrial Technology Research Institute, Hsinchu (TW)

(72) Inventors: Chia-Ling Fan, Hsinchu City (TW); Yi-Hsing Tsai, Hualien County (TW); Chia-Ling Lo, Taichung City (TW)

(73) Assignee: Industrial Technology Research Institute, Hsinchu (TW)

( * ) Notice: Subject to any disclaimer, the term of this patent is extended or adjusted under 35 U.S.C. 154(b) by 366 days.

(21) Appl. No.: 18/544,467

(22) Filed: Dec. 19, 2023

(65) Prior Publication Data

US 2025/0191137 A1 Jun. 12, 2025

(30) Foreign Application Priority Data

Dec. 8, 2023 (TW) ................................ 112147819

(51) Int. Cl.
*G06T 5/60* (2024.01)

(52) U.S. Cl.
CPC ...................................... *G06T 5/60* (2024.01)

(58) Field of Classification Search
None
See application file for complete search history.

(56) References Cited

U.S. PATENT DOCUMENTS 10,878,285 B2 12/2020 Ahmed et al.
10,950,014 B2 3/2021 Wheaton et al.
11,308,659 B2 4/2022 Duckworth et al.
11,417,063 B2 8/2022 Lin et al.
2019/0354772 A1 11/2019 Tasli et al.
2022/0198738 A1 6/2022 Xu et al.
2023/0018560 A1 1/2023 Briggs
2023/0154102 A1 5/2023 Aumentado-Armstrong et al.
2023/0154104 A1 5/2023 Zhuang et al.
(Continued)

FOREIGN PATENT DOCUMENTS

| | | |
|---|---|---|
| CN | 110211090 | 9/2019 |
| CN | 110378885 | 10/2019 |

(Continued)

OTHER PUBLICATIONS

F. Alharbi, K. E. Hindi and S. Al-Ahmadi, "Error-Based Noise Filtering During Neural Network Training," in IEEE Access, vol. 8, pp. 156996-157004, 2020, doi: 10.1109/ACCESS.2020.3019465. (Year: 2020).*

(Continued)

*Primary Examiner* — David Ometz
(74) *Attorney, Agent, or Firm* — JCIPRNET

(57) ABSTRACT

A device and a method for data cleansing are provided. The method includes following steps: receiving, by the processor, an image through the transceiver, wherein the image include a picture; when the processor determines that a continuous value corresponding to the image is greater than a continuous value threshold, performing, by the processor, a global continuity detection on the picture to obtain a gradient distribution value corresponding to the picture; and using, by the processor, the gradient distribution value to determine whether to perform a data cleansing corresponding to a training set on the picture.

18 Claims, 4 Drawing Sheets

(56) References Cited

U.S. PATENT DOCUMENTS

| | | | | |
|---|---|---|---|---|
| 2023/0394651 | A1* | 12/2023 | Li | G06N 3/0475 |
| 2023/0394706 | A1 | 12/2023 | Giampietro et al. | |
| 2024/0028874 | A1* | 1/2024 | Chen | G06N 3/0455 |
| 2024/0296528 | A1* | 9/2024 | Xiao | G06T 5/70 |

FOREIGN PATENT DOCUMENTS

| | | | | |
|---|---|---|---|---|
| CN | 111353553 A | * | 6/2020 | G06F 18/214 |
| CN | 111652259 A | * | 9/2020 | G06F 18/24 |
| CN | 113379715 | | 9/2021 | |
| CN | 115798719 | | 3/2023 | |
| CN | 116127119 | | 5/2023 | |

OTHER PUBLICATIONS

Michael G. Pecht; Myeongsu Kang, “Machine Learning: Data Pre-processing,” in Prognostics and Health Management of Electronics: Fundamentals, Machine Learning, and the Internet of Things , IEEE, 2019, pp. 111-130. (Year: 2019).*

V. Gulati and N. Raheja, “Efficiency Enhancement of Machine Learning Approaches through the Impact of Preprocessing Techniques,” 2021 6th International Conference on Signal Processing, Computing and Control (ISPCC), Solan, India, 2021, pp. 191-196. (Year: 2021).*

Renggli et al; “A Data Quality-Driven View of MLOps”; arXiv:2102.07750v1; Feb. 15, 2021, pp. 1-12. (Year: 2021).*

Suzuki et al; “Data Cleansing for Deep Neural Networks with Storage-efficient Approximation of Influence Functions”; arXiv: 2103.11807v2; Jun. 1, 2021; pp. 1-9. (Year: 2021).*

Radu Alexandru Rosu et al., “NeuralMVS: Bridging Multi-View Stereo and Novel View Synthesis”, 2022 International Joint Conference on Neural Networks (IJCNN), Jun. 15, 2022, pp. 1-7.

Qiangeng Xu et al., “Point-NeRF: Point-based Neural Radiance Fields”, 2022 IEEE/CVF Conference on Computer Vision and Pattern Recognition (CVPR), Mar. 15, 2023, pp. 1-17.

Abril Corona-Figueroa et al., “MedNeRF: Medical Neural Radiance Fields for Reconstructing 3D-aware CT-Projections from a Single X-ray”, 2022 44th Annual International Conference of the IEEE Engineering in Medicine & Biology Society (EMBC), Apr. 8, 2022, pp. 1-6.

Alexandra Carlson et al., “CLONeR: Camera-Lidar Fusion for Occupancy Grid-aided Neural Representations”, IEEE Robotics and Automation Letters, Apr. 4, 2023, pp. 1-8.

Chang Xu et al., “3D reconstruction of insects: an improved multifocus stacking and an evaluation of learning-based MVS approaches”, 2021 International Conference on 3D Vision (3DV), Dec. 1-3, 2021, pp. 1411-1419.

David B. Lindell et al., “BACON: Band-limited Coordinate Networks for Multiscale Scene Representation”, CVPR 2022, Mar. 28, 2022, pp. 16252-16262.

Qiufu Li et al., “3D Neuron Reconstruction in Tangled Neuronal Image With Deep Networks”, IEEE Transactions on Medical Imaging, vol. 39, No. 2, Feb. 2020, pp. 425-435.

“Office Action of Taiwan Counterpart Application”, issued on Sep. 20, 2024, p. 1-p. 7.

* cited by examiner

The processor obtains the continuous value corresponding to the image.

DEVICE AND METHOD FOR DATA CLEANSING

CROSS-REFERENCE TO RELATED APPLICATION

This application claims the priority benefit of Taiwan application serial no. 112147819, filed on Dec. 8, 2023. The entirety of the above-mentioned patent application is hereby incorporated by reference herein and made a part of this specification.

TECHNICAL FIELD

The present disclosure relates to a device and a method for data cleansing.

BACKGROUND

Currently, in the field of artificial intelligence/deep learning, 3D modeling technology requires a lot of training data (pictures), and requires manpower to filter/clean the training data. How to perform data cleansing more efficiently is one of the goals that those skilled in the art should strive for.

SUMMARY

The present disclosure provides a device and a method for data cleansing, which can perform the data cleansing more efficiently.

The device for data cleansing of the present disclosure includes a transceiver and a processor. The processor is coupled to the transceiver, wherein the processor receives an image through the transceiver, wherein the image includes a picture; when the processor determines that a continuous value corresponding to the image is greater than a continuous value threshold, the processor performs a global continuity detection on the picture to obtain a gradient distribution value corresponding to the picture; the processor uses the gradient distribution value to determine whether to perform a data cleansing corresponding to a training set on the picture.

The method for data cleansing of the present disclosure includes following steps: receiving, by the processor, an image through the transceiver, wherein the image includes a picture; when the processor determines that a continuous value corresponding to the image is greater than a continuous value threshold, performing, by the processor, a global continuity detection on the picture to obtain a gradient distribution value corresponding to the picture; and using, by the processor, the gradient distribution value to determine whether to perform a data cleansing corresponding to a training set on the picture.

DESCRIPTION OF THE EMBODIMENTS

Figure 1:
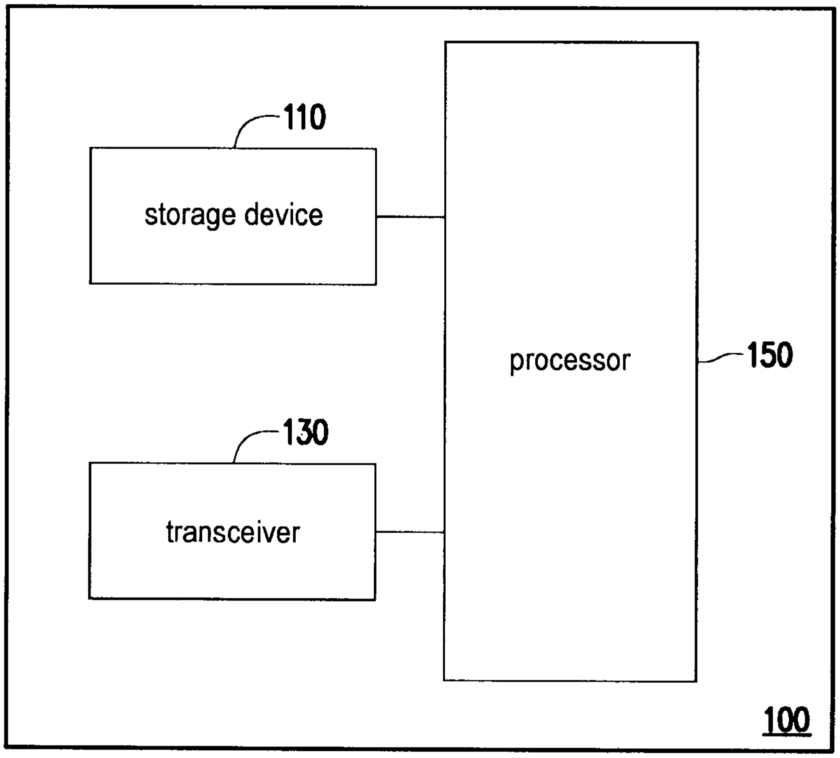
FIG. 1 is a schematic diagram of a device for data cleansing according to an embodiment of the present disclosure.

FIG. 1 is a schematic diagram of a device 100 for data cleansing according to an embodiment of the present disclosure. Please refer to FIG. 1. Device 100 may include storage device 110, transceiver 130, and processor 150.

The storage device 110 is, for example, any type of fixed or removable random access memory (random access memory, RAM), read-only memory (read-only memory, ROM), flash memory (flash memory), hard disk drive (HDD), solid state drive (SSD) or similar components or a combination of the above components, used to store multiple modules or various applications that can be executed by the processor 150.

The transceiver 130 transmits and receives signals in a wireless or wired manner.

The processor 150 is, for example, a central processing unit (CPU), or other programmable general-purpose or special-purpose micro control unit (MCU), microprocessor (microprocessor), or digital signal processor (digital). signal processor (DSP), programmable controller, application specific integrated circuit (ASIC), graphics processor (graphics processing unit, GPU), image signal processor (image signal processor, ISP), image processing unit (image processing unit, IPU), arithmetic logic unit (ALU), complex programmable logic device (CPLD), field programmable gate array (FPGA) or others Similar elements or combinations of the above elements. The processor 150 can be coupled to the storage device 110 and the transceiver 130, and access and execute multiple modules and various applications stored in the storage device 110.

Figure 2:
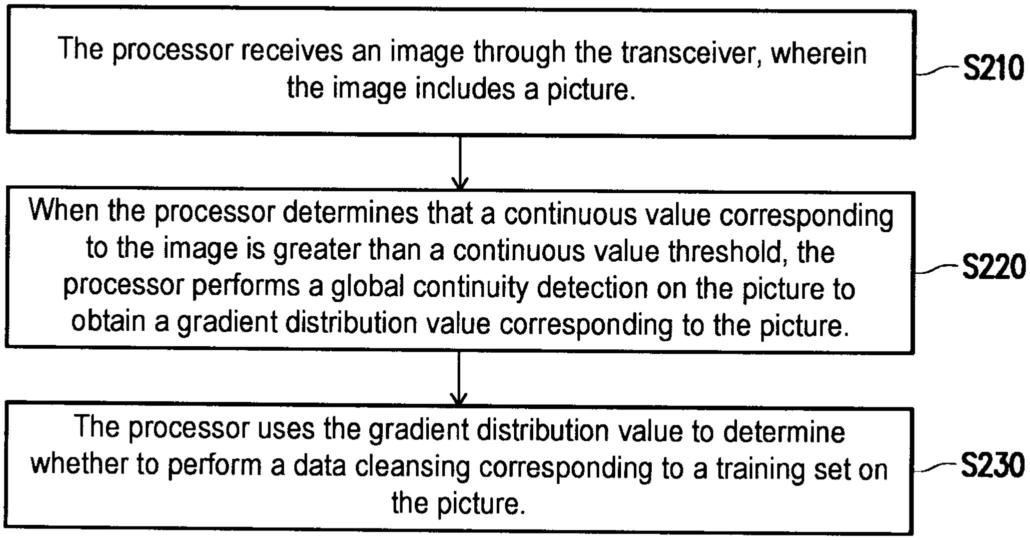
FIG. 2 is a flow chart of a method for data cleansing according to an embodiment of the present disclosure.

FIG. 2 is a flow chart of a method for data cleansing according to an embodiment of the present disclosure, wherein the method can be executed by the device 100 shown in FIG. 1. Please refer to FIG. 1 and FIG. 2 at the same time.

In step S210, the processor 150 can receive an image through the transceiver 130, wherein the image includes a picture.

In step S220, when the processor 150 determines that a continuous value corresponding to the image is greater than a continuous value threshold, the processor 150 may perform a global continuity detection on the picture to obtain a gradient distribution value (PR, Percentile Rank) corresponding to the picture. In one embodiment, the continuous value threshold may be 0.75. An implementation example of "continuous value corresponding to the image" in step S220 will be described below with reference to FIG. 3.

Figure 3:
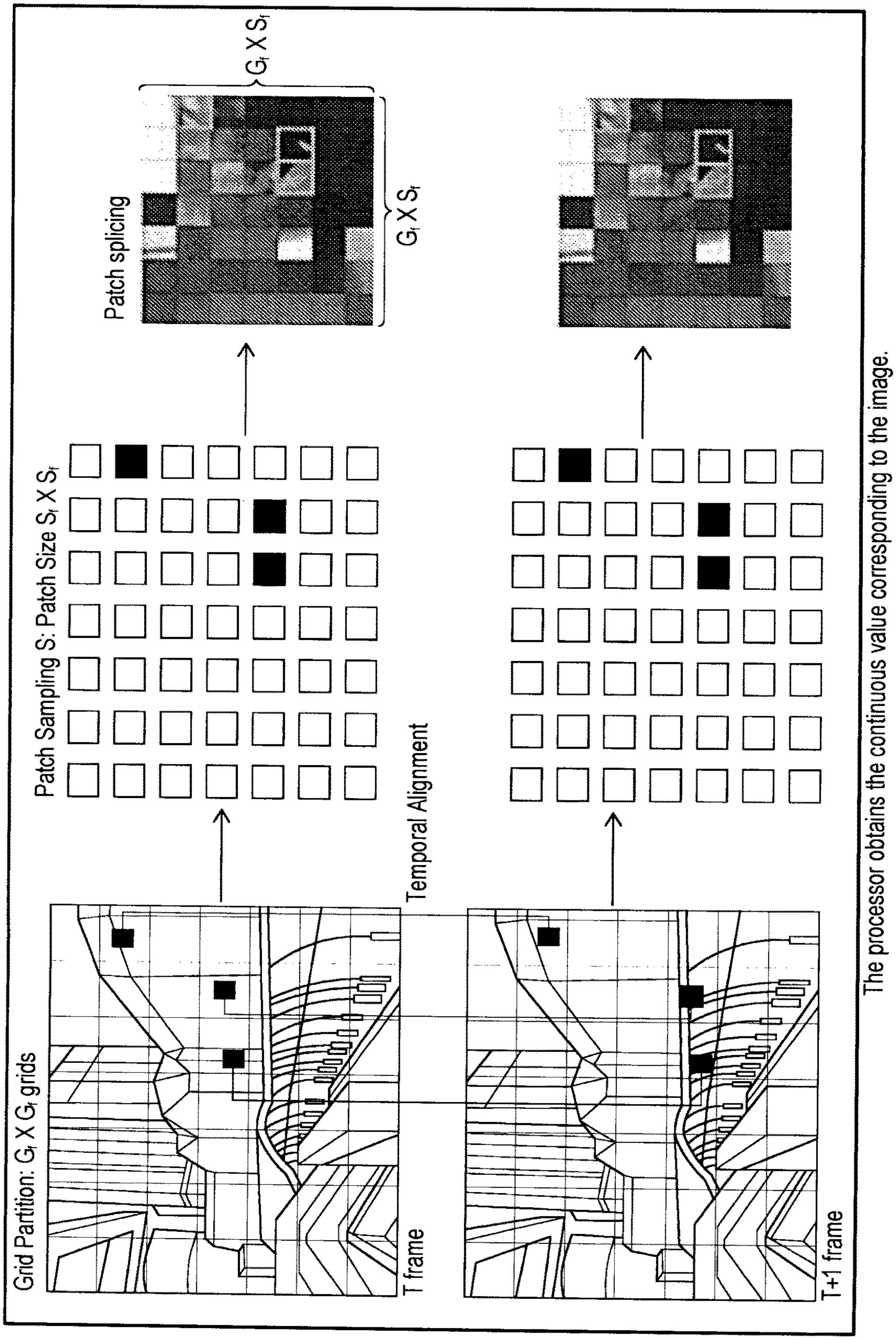
FIG. 3 is a schematic diagram illustrating obtaining the continuous value corresponding to the image according to an embodiment of the present disclosure.

FIG. 3 is a schematic diagram illustrating obtaining the continuous value corresponding to the image according to an embodiment of the present disclosure. Please refer to FIG. 1, FIG. 2 and FIG. 3 at the same time. In this embodiment, the processor 150 can perform an image normalization, an image feature value extraction, and a nonlinear layer feature regression operation on the image to obtain the continuous value. As shown in FIG. 3, processor 150 can divide each frame of the image into a uniform grid. Then, for the image in each grid, the processor 150 can use a convolutional neural network to perform the feature extraction. In detail, for the grid of the current frame, the processor 150 may use the relative position relationship between the positions of different grids to obtain scene features. On the other hand, for the grid of the cross frame, the processor 150 can obtain temporal motion trajectories, behavioral changes, and dynamic characteristics of the entire image sequence. After obtaining the features of each grid, the processor 150 can input these features into a regression model to obtain the continuous value corresponding to the image.

Please return to FIG. 2. In step S230, the processor 150 may use the gradient distribution value to determine whether to perform a data cleansing corresponding to a training set on the picture.

Figure 4A:
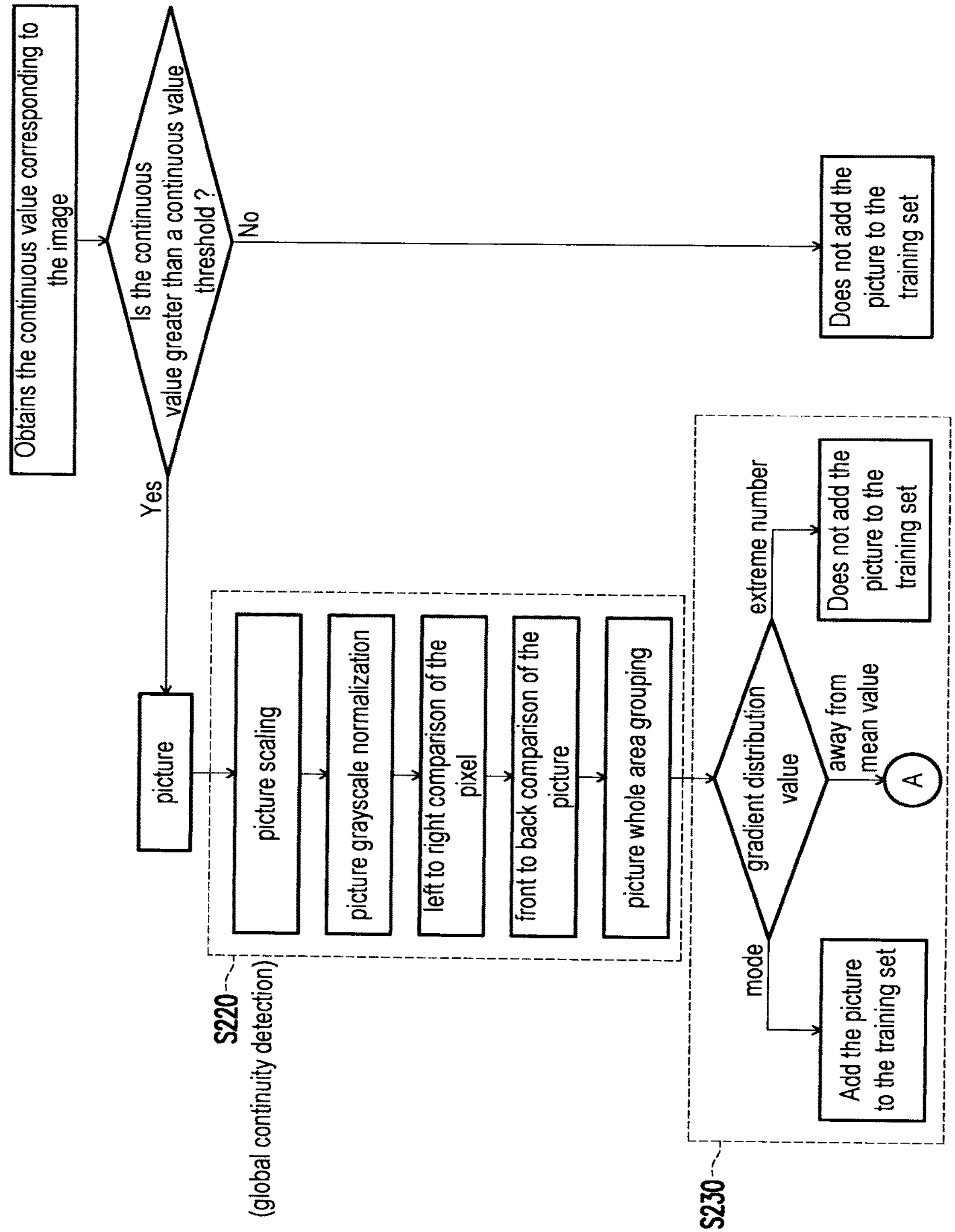
FIGS. 4A and 4B are flowcharts of a method for data cleansing according to another embodiment of the present disclosure.
Figure 4B:
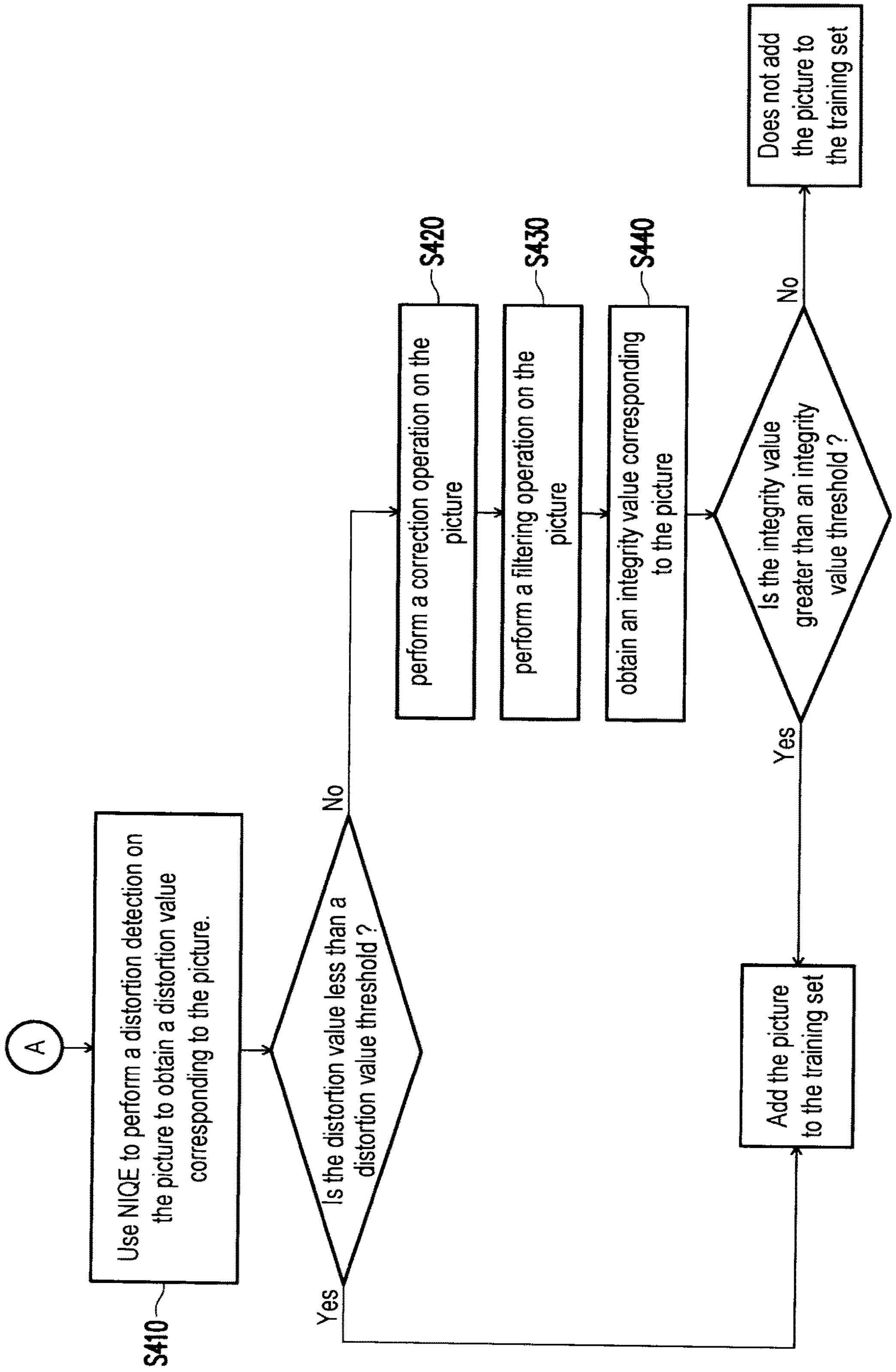

FIGS. 4A and 4B are flowcharts of a method for data cleansing according to another embodiment of the present disclosure. Please refer to FIG. 1, FIG. 2, FIG. 3, FIG. 4A and FIG. 4B at the same time. After the processor 150 obtains the continuous value corresponding to the image, the processor 150 may determine whether the continuous value corresponding to the image is greater than the continuous value threshold. As shown in FIG. 4A, when the processor 150 determines that the continuous value is not greater than the continuous value threshold, the processor 150 does not add the picture to the training set. On the other hand, when the processor 150 determines that the continuous value corresponding to the image is greater than the continuous value threshold, as shown in step S220 of FIG. 4A, the processor 150 can perform a global continuity detection on the picture to obtain a gradient distribution value corresponding to the picture. In this embodiment, the picture may include a pixel. Furthermore, the global continuity detection can include a picture scaling, a picture grayscale normalization, a left to right comparison of the pixel, a front to back comparison of the picture, and a picture whole area grouping. Specifically, the picture scaling can be, the processor 150 removes the details of the picture and retains the structure and the light and dark information of the picture. The picture grayscale normalization can be, the processor 150 converts the picture into grayscale. The left to right comparison of the pixel can be, the processor 150 compares all pixels from left to right. If the left pixel is larger than the right pixel, the processor 150 marks as 1. On the other hand, if the left pixel is less than or equal to the right pixel, the processor 150 marks as 0. Thereby, the processor 150 can generate a matrix of difference values for this picture. The front to back comparison of the picture can be, the processor 150 uses Hamming distance to calculate the difference degree between a previous picture and a latter picture in the image. If the Hamming distance value of the previous picture and the latter picture is smaller, the similarity between the previous picture and the latter picture is higher. On the other hand, if the Hamming distance value of the previous picture and the latter picture is larger, the similarity between the previous picture and the latter picture is lower. The picture whole area grouping can be, the processor 150 groups all pictures according to similarity (that is, similar pictures are grouped into the same group). After performing the picture whole area grouping, the processor 150 may perform gradient sorting on the pictures in each group to obtain the gradient distribution value corresponding to the picture.

Next, as shown in step S230 of FIG. 4A, when the processor 150 determines that the gradient distribution value is a mode, the processor 150 can add the picture to the training set. On the other hand, when processor 150 determines that the gradient distribution value is an extreme number, processor 150 does not add the picture to the training set. In one embodiment, the mode is, for example, the gradient distribution value between 40 and 60. On the other hand, the extreme number is, for example, that the gradient distribution value greater than 90 or less than 10.

Please continue to refer to FIG. 4A and FIG. 4B. As shown in step S410 of FIG. 4B, when the processor 150 determines that the gradient distribution value is an away from mean value, the processor 150 can use a natural image quality evaluator (NIQE) to perform a distortion detection on the picture to obtain a distortion value corresponding to the picture. In one embodiment, the above-mentioned away from mean value is, for example, the gradient distribution value greater than 10 and less than 40, or the gradient distribution value greater than 60 and less than 90. When the processor 150 determines that the distortion value is less than a distortion value threshold, the processor 150 can add the picture to the training set. In one embodiment, the distortion value threshold may be 10. On the other hand, as shown in step S420, step S430 and step S440 of FIG. 4B, when the processor 150 determines that the distortion value is not less than the distortion value threshold, the processor 150 can perform a correction operation and a filtering operation on the picture to obtain an integrity value corresponding to the picture.

In one embodiment, in step S420 of FIG. 4B, the processor 150 may use a DBGAN (Data Balancing Generative Adversarial Network) to perform the correction operation on the picture. In detail, processor 150 can use BGAN (Balancing Generative Adversarial Network) to learn the blur process of the picture to generate a blurred synthetic picture. The processor 150 can then input the blurred synthetic picture to the DBGAN to transform the picture from blurry to clear.

In one embodiment, in step S430 of FIG. 4B, the processor 150 may use an edge detection technology to perform the filtering operation on the picture. In detail, the processor 150 can use the edge detection technology to determine whether the contour of the picture is complete.

After executing step S420, step S430 and step S440 of FIG. 4B, when the processor 150 determines that the integrity value is greater than the integrity value threshold, the processor 150 may add the picture to the training set. On the other hand, when the processor 150 determines that the integrity value is not greater than the integrity value threshold, the processor 150 does not add the picture to the training set. In one embodiment, the integrity value threshold may be 100.

To sum up, the device and the method for data cleansing of the present disclosure can use the gradient distribution value corresponding to the picture to determine whether to perform the data cleansing corresponding to the training set on the picture, after determining that the continuous value corresponding to the image is greater than the continuous value threshold. In other words, after the present disclosure determines that a specific picture is not to be added to the training set, the picture can be automatically deleted (data cleansing). Based on this, no manpower is required to perform filtering/cleansing of the training data, so that the data cleansing can be performed more efficiently.

What is claimed is:

1. A device for data cleansing, including:
- a transceiver; and
- a processor, coupled to the transceiver, wherein
  - the processor receives an image through the transceiver, wherein the image includes a picture;
  - when the processor determines that a continuous value corresponding to the image is greater than a continuous value threshold, the processor performs a global continuity detection on the picture to obtain a gradient distribution value corresponding to the picture;
  - the processor uses the gradient distribution value to determine whether to perform a data cleansing corresponding to a training set on the picture, wherein the picture includes a pixel, wherein the global continuity detection includes a picture scaling, a picture grayscale normalization, a left to right comparison of the pixel, a front to back comparison of the picture, and a picture whole area grouping.

2. The device of claim 1, wherein the continuous value threshold is 0.75.

3. The device of claim 1, wherein the processor performs an image normalization, an image feature value extraction, and a nonlinear layer feature regression operation on the image to obtain the continuous value.

4. The device of claim 1, wherein when the processor determines that the continuous value is not greater than the continuous value threshold, the processor does not add the picture to the training set.

5. The device of claim 1, wherein when the processor determines that the gradient distribution value is a mode, the processor adds the picture to the training set.

6. The device of claim 1, wherein when the processor determines that the gradient distribution value is an extreme number, the processor does not add the picture to the training set.

7. The device of claim 1, wherein when the processor determines that the gradient distribution value is an away from mean value, the processor uses a natural image quality evaluator (NIQE) to perform a distortion detection on the picture to obtain a distortion value corresponding to the picture;

when the processor determines that the distortion value is less than a distortion value threshold, the processor adds the picture to the training set.

8. The device of claim 7, wherein the distortion value threshold is 10.

9. The device of claim 7, wherein when the processor determines that the distortion value is not less than the distortion value threshold, the processor performs a correction operation and a filtering operation on the picture to obtain an integrity value corresponding to the picture;

when the processor determines that the integrity value is greater than an integrity value threshold, the processor adds the picture to the training set;

when the processor determines that the integrity value is not greater than the integrity value threshold, the processor does not add the picture to the training set.

10. The device of claim 9, wherein the integrity value threshold is 100.

11. The device of claim 9, wherein the processor uses a DBGAN (Data Balancing Generative Adversarial Network) to perform the correction operation on the picture.

12. The device of claim 9, wherein the processor uses an edge detection technology to perform the filtering operation on the picture.

13. A method for data cleansing, applicable for a device including a transceiver and a processor, wherein the method includes following steps:

receiving, by the processor, an image through the transceiver, wherein the image includes a picture;

when the processor determines that a continuous value corresponding to the image is greater than a continuous value threshold, performing, by the processor, a global continuity detection on the picture to obtain a gradient distribution value corresponding to the picture; and using, by the processor, the gradient distribution value to determine whether to perform a data cleansing corresponding to a training set on the picture, wherein the picture includes a pixel, wherein the global continuity detection includes a picture scaling, a picture grayscale normalization, a left to right comparison of the pixel, a front to back comparison of the picture, and a picture whole area grouping.

14. The method of claim 13, wherein the method further includes following steps:

performing, by the processor, an image normalization, an image feature value extraction, and a nonlinear layer feature regression operation on the image to obtain the continuous value.

15. The method of claim 13, wherein the method further includes following steps:

when the processor determines that the gradient distribution value is an away from mean value, using, by the processor, a natural image quality evaluator (NIQE) to perform a distortion detection on the picture to obtain a distortion value corresponding to the picture; and when the processor determines that the distortion value is less than a distortion value threshold, adding, by the processor, the picture to the training set.

16. The method of claim 15, wherein the method further includes following steps:

when the processor determines that the distortion value is not less than the distortion value threshold, performing, by the processor, a correction operation and a filtering operation on the picture to obtain an integrity value corresponding to the picture;

when the processor determines that the integrity value is greater than an integrity value threshold, adding, by the processor, the picture to the training set; and when the processor determines that the integrity value is not greater than the integrity value threshold, not adding, by the processor, the picture to the training set.

17. The method of claim 16, wherein when the processor determines that the distortion value is not less than the distortion value threshold, performing, by the processor, the correction operation and the filtering operation on the picture to obtain the integrity value corresponding to the picture includes following steps:

using, by the processor, a DBGAN (Data Balancing Generative Adversarial Network) to perform the correction operation on the picture.

18. The method of claim 16, wherein when the processor determines that the distortion value is not less than the distortion value threshold, performing, by the processor, the correction operation and the filtering operation on the picture to obtain the integrity value corresponding to the picture includes following steps:

using, by the processor, an edge detection technology to perform the filtering operation on the picture.

* * * * *